US009177531B2

(12) United States Patent
Bono

(10) Patent No.: US 9,177,531 B2
(45) Date of Patent: Nov. 3, 2015

(54) IMAGE PROCESSING DEVICE AND NON-TRANSITORY COMPUTER-READABLE STORAGE MEDIUM STORING IMAGE PROCESSING PROGRAM

(71) Applicant: DeNA Co., Ltd., Tokyo (JP)

(72) Inventor: Hironori Bono, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 129 days.

(21) Appl. No.: 14/079,439

(22) Filed: Nov. 13, 2013

(65) Prior Publication Data
US 2015/0062169 A1    Mar. 5, 2015

(30) Foreign Application Priority Data

Aug. 28, 2013   (JP) .................................. 2013-176924

(51) Int. Cl.
| | |
|---|---|
| G09G 5/00 | (2006.01) |
| G09G 5/14 | (2006.01) |
| G06F 9/54 | (2006.01) |
| G06T 11/00 | (2006.01) |
| G06T 15/50 | (2011.01) |

(52) U.S. Cl.
CPC *G09G 5/14* (2013.01); *G06F 9/545* (2013.01); *G06T 11/00* (2013.01); *G06T 15/503* (2013.01); *G09G 2340/12* (2013.01)

(58) Field of Classification Search
None
See application file for complete search history.

(56) References Cited

U.S. PATENT DOCUMENTS

| | | | | |
|---|---|---|---|---|
| 8,610,725 | B2* | 12/2013 | Sandmel et al. | 345/501 |
| 2002/0169918 | A1* | 11/2002 | Piatetsky et al. | 710/306 |
| 2003/0091023 | A1* | 5/2003 | Gambino | 370/351 |
| 2007/0294695 | A1* | 12/2007 | Jensen et al. | 718/102 |
| 2008/0130559 | A1* | 6/2008 | Pi | 370/329 |
| 2009/0079763 | A1* | 3/2009 | Takeichi | 345/630 |
| 2010/0259536 | A1* | 10/2010 | Toksvig et al. | 345/418 |
| 2011/0141119 | A1* | 6/2011 | Ito | 345/441 |
| 2012/0050773 | A1* | 3/2012 | Ito | 358/1.13 |
| 2012/0096093 | A1* | 4/2012 | Bouw et al. | 709/206 |
| 2014/0079043 | A1* | 3/2014 | Montemurro et al. | 370/338 |
| 2014/0137131 | A1* | 5/2014 | Dheap et al. | 718/104 |
| 2014/0282968 | A1* | 9/2014 | Aboughanaima et al. | 726/7 |

FOREIGN PATENT DOCUMENTS

| | | |
|---|---|---|
| JP | 2008-040800 A | 2/2008 |
| JP | 2011-186834 A | 9/2011 |
| JP | 4948217 B | 3/2012 |

OTHER PUBLICATIONS

Japanese Patent Application No. 2013-176924: Office Action mailed on Nov. 26, 2013.

* cited by examiner

*Primary Examiner* — David H Chu
(74) *Attorney, Agent, or Firm* — Procopio, Cory, Hargreaves & Savitch LLP

(57) ABSTRACT

When a process of rendering an image in a single frame is performed by allocating an object to be displayed as an image to any of a plurality of layers and superimposing the plurality of layers, an image processing device refers to an object database including a list of object rendering commands for each layer and dynamically changes the number of object rendering processes performed in each layer according to the number of rendering commands included in the list, at the time of rendering an image in a single frame.

10 Claims, 5 Drawing Sheets

LAYER A  OBJECTS A1 TO A5

| RENDERING COMMAND | OBJECT TO BE RENDERED | PROCESSING DETAIL |
|---|---|---|
| 1 | OBJECT A1 | CHANGE NUMERIC VALUE |

LAYER B  OBJECTS B1 TO B3

| RENDERING COMMAND | OBJECT TO BE RENDERED | PROCESSING DETAIL |
|---|---|---|
| 1 | OBJECT B1 | MOVE 2 DOTS TO RIGHT AND 3 DOTS UP |
| 2 | OBJECT B2 | MOVE 5 DOTS TO LEFT AND 5 DOTS DOWN |
| 3 | ⋮ | ⋮ |
| ⋮ | ⋮ | ⋮ |
| 9 | | |
| 10 | OBJECT B3 | ROTATE 45° |

LAYER C  OBJECTS C1 TO C4

| RENDERING COMMAND | OBJECT TO BE RENDERED | PROCESSING DETAIL |
|---|---|---|
| 1 | OBJECT C1 | MOVE 3 DOTS TO RIGHT AND 3 DOTS UP |
| 2 | OBJECT C2 | MOVE 5 DOTS TO RIGHT AND 5 DOTS UP |
| 3 | ⋮ | ⋮ |
| ⋮ | ⋮ | ⋮ |
| 99 | | |
| 100 | OBJECT C4 | MOVE 5 DOTS TO RIGHT AND 5 DOTS UP |

FIG. 3

LAYER A   OBJECTS A1 TO A5

| RENDERING COMMAND | OBJECT TO BE RENDERED | PROCESSING DETAIL |
|---|---|---|
| 1 | OBJECT A1 | CHANGE NUMERIC VALUE |

LAYER B   OBJECTS B1 TO B3

| RENDERING COMMAND | OBJECT TO BE RENDERED | PROCESSING DETAIL |
|---|---|---|
| 1 | OBJECT B1 | MOVE 2 DOTS TO RIGHT AND 3 DOTS UP |
| 2 | OBJECT B2 | MOVE 5 DOTS TO LEFT AND 5 DOTS DOWN |
| 3 ⋮ 9 | ⋮ | ⋮ |
| 10 | OBJECT B3 | ROTATE 45° |

LAYER C   OBJECTS C1 TO C4

| RENDERING COMMAND | OBJECT TO BE RENDERED | PROCESSING DETAIL |
|---|---|---|
| 1 | OBJECT C1 | MOVE 3 DOTS TO RIGHT AND 3 DOTS UP |
| 2 | OBJECT C2 | MOVE 5 DOTS TO RIGHT AND 5 DOTS UP |
| 3 ⋮ 99 | ⋮ | ⋮ |
| 100 | OBJECT C4 | MOVE 5 DOTS TO RIGHT AND 5 DOTS UP |

FIG. 5

| LAYER B | OBJECTS B1 TO B3 | |
|---|---|---|
| RENDERING COMMAND | OBJECT TO BE RENDERED | PROCESSING DETAIL |
| 1 | OBJECT B1 | MOVE 3 DOTS TO RIGHT AND 3 DOTS UP |
| 2 | OBJECT B2 | MOVE 5 DOTS TO LEFT AND 5 DOTS DOWN |
| 3 | - - - | - - - |
| 9 | | |
| 10 | OBJECT B3 | ROTATE 45° |
| 11 | | |

← MOVE OBJECT B1 2 DOTS TO RIGHT AND 1 DOT DOWN

| RENDERING COMMAND | OBJECT TO BE RENDERED | PROCESSING DETAIL |
|---|---|---|
| 1 | OBJECT B1 | MOVE 5 DOTS TO RIGHT AND 2 DOTS UP |
| 2 | OBJECT B2 | MOVE 5 DOTS TO LEFT AND 5 DOTS DOWN |
| 3 | - - - | - - - |
| 9 | | |
| 10 | OBJECT B3 | ROTATE 45° |

← ADD UP RENDERING COMMANDS FOR OBJECT B1

IMAGE PROCESSING DEVICE AND NON-TRANSITORY COMPUTER-READABLE STORAGE MEDIUM STORING IMAGE PROCESSING PROGRAM

BACKGROUND OF THE INVENTION

1. Field of the Invention

The present invention relates to an image processing device and an image processing program which display an image by superimposing a plurality of layers.

2. Description of Related Art

There is known a method of constructing and displaying a single image by superimposing a plurality of layers when displaying an image on a display provided to a computer, a smartphone, a tablet or the like. That is, each layer is an image region like a transparent film where an image is fused such that a layer superimposed below each layer is seen through a transparent image region outside an image region corresponding to an opaque object provided in each layer. The layers can be superimposed on top of one another while changing the position of each layer relative to another layer, and an image of an object rendered in each layer can be arranged at a desired position by moving each layer in a sliding motion. Moreover, an image of an object rendered by changing the opacity of a layer can be made partially transparent.

In an electronic game, for example, a single image is constructed and displayed on the display by superimposing a layer in which a background image is rendered, a character layer in which an image of a character appearing in a game is rendered, an HUD layer in which an image indicating a condition or the like of a friend or enemy character is rendered, and the like.

In order to reduce the load on a CPU at the time of such image rendering, there is disclosed a technique where a first region to be an index for a timing to input an operation is subjected to rendering at a frame rate higher than that of a second region (Japanese Patent No. 4948217, for example).

SUMMARY OF THE INVENTION

Technical Problems

The aforementioned technique is applied in a limited case when the region subjected to rendering at the high frame rate is fixed.

In the processing performed by calling an API to render an object for each layer, there is a possibility that a frame is not displayed smoothly when calling the API equally for each layer in a case where the number of calls made to the API that can be processed per unit time is limited by the performance of a computer or the like.

Accordingly, it is desired to provide a technique that can be applied in various situations and allows for smooth display of a picture in the processing where the number of calls made to the API is limited.

Solution

One aspect of the present invention is an image processing device which performs a process of rendering an image in a single frame by allocating an object to be displayed as an image to any of a plurality of layers and superimposing the plurality of layers. The image processing device refers to an object database including a list of object rendering commands for each layer and dynamically changes the number of object rendering processes performed in each layer according to the number of rendering commands included in the list when rendering an image in a single frame.

Another aspect of the present invention is an image processing program provided to perform a process of rendering an image in a single frame by allocating an object to be displayed as an image to any of a plurality of layers and superimposing the plurality of layers. The image processing program causes a computer to function as a means which refers to an object database including a list of object rendering commands for each layer and dynamically changes the number of object rendering processes performed in each layer according to the number of rendering commands included in the list when rendering an image in a single frame, the computer including a storage unit which stores the object database.

Here, priority is set to each layer where it is preferred to preferentially perform the object rendering process on a layer with high priority over a layer with low priority.

It is also preferred to distribute, to the plurality of layers, the number of rendering commands that can be executed in the image rendering for a single frame and perform the process of rendering the object allocated to the plurality of layers in accordance with the number of rendering commands being distributed.

It is also preferred to calculate a numeric value A by dividing the number of rendering commands registered in the list of the object database in association with the layer subjected to the rendering process by the remaining number of rendering commands that can be executed in the rendering process for a single frame, calculate a numeric value B by dividing the number of rendering commands that can be executed in the rendering process for a single frame by the numeric value A, and execute the rendering command corresponding in number to the numeric value B in the layer subjected to the rendering process.

It is also preferred to rewrite a rendering command to a command obtained by adding up a rendering command that is already registered and an additional rendering command, when the additional rendering command is output to an object that is subjected to the rendering command that is already registered in the list included in the object database.

It is also preferred to measure the number of rendering commands that can be executed in the image rendering for a single frame and distribute, to the plurality of layers, the number of rendering commands that can be executed in the image rendering for a single frame in accordance with the measured value.

Effects of the Invention

The present invention can realize smooth display of an image in the image processing where a plurality of objects is allocated to a layer, a plurality of which is then superimposed to be displayed.

BRIEF DESCRIPTION OF THE DRAWINGS

FIG. 3 is a set of diagrams illustrating a registration example of an object database according to an embodiment of the present invention;

FIG. 5 is a set of diagrams illustrating a registration example of the object database according to an embodiment of the present invention.

DETAILED DESCRIPTION OF THE INVENTION

Figure 1:
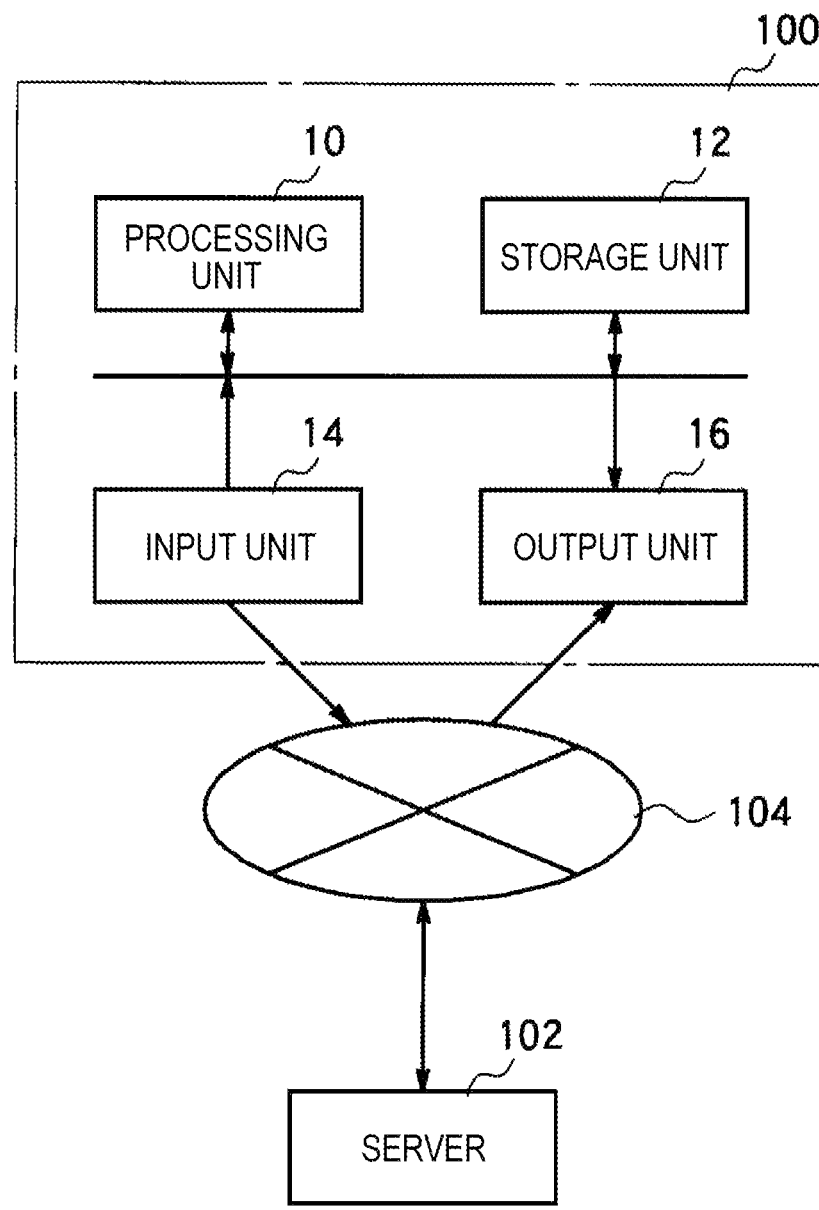
FIG. 1 is a diagram illustrating a configuration of an image processing device according to an embodiment of the present invention.

An image processing device 100 according to an embodiment of the present invention includes a processing unit 10, a storage unit 12, an input unit 14, and an output unit 16, as illustrated in FIG. 1. That is, the image processing device 100 includes the basic configuration of a computer and can be implemented by a general PC, smartphone, tablet, mobile phone, or the like. A part of the function of the image processing device 100 may also be implemented by an external server 102 that is connected by a communication means 104 such as the Internet.

The processing unit 10 includes a means such as a CPU that performs arithmetic processing. The processing unit 10 performs image processing according to the present embodiment by executing an image processing program stored in the storage unit 12. The storage unit 12 includes a storage means such as a semiconductor memory or a hard disk. The storage unit 12 is connected to the processing unit 10 in an accessible manner and stores the image processing program, image data of each object used in the image processing, and an object database including a list of object rendering commands, for example. The input unit 14 includes a means that inputs information to the image processing device 100. The input unit 14 includes a touch panel or a keyboard that accepts input from a user, for example. The input unit 14 further includes a network interface or the like that receives information from outside the image processing device 100, and receives the image processing program and the image data of each object used in the image processing. The output unit 16 includes a means that outputs information processed by the image processing device 100. The output unit 16 includes a display that presents an image to the user, for example. The output unit further includes a network interface or the like that transmits information to the outside of the image processing device 100 and transmits information to the external server 102 or the like.

The present embodiment will describe a process of rendering a plurality of objects allocated in three layers, the process being performed by the image processing device 100. Note that the number of layers or objects is not limited to what is described.

Figure 2:
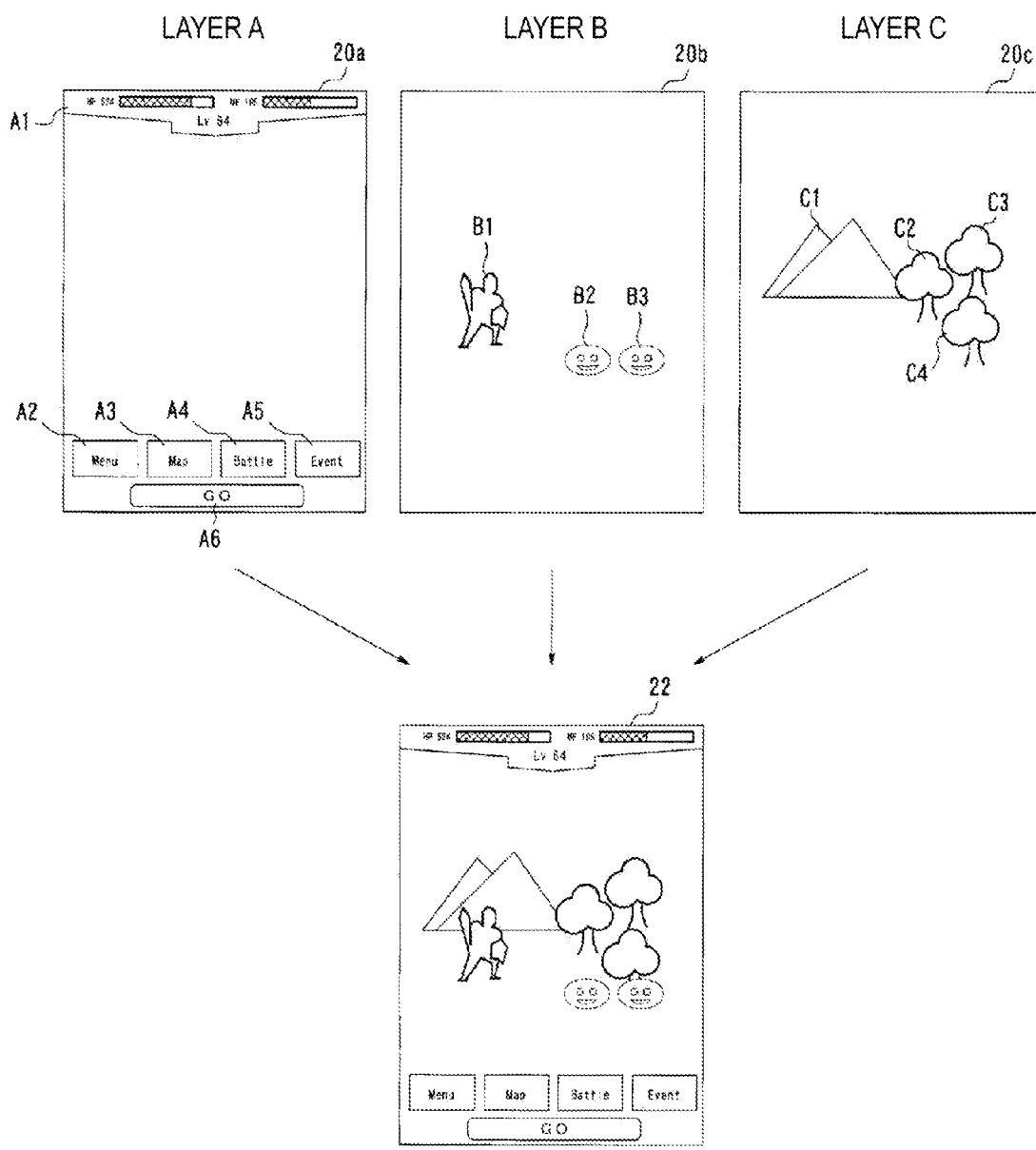
FIG. 2 is a set of diagrams illustrating a construction of an image according to an embodiment of the present invention.

FIG. 2 is a set of diagrams illustrating an example of a construction of an image 22 in the image processing device 100. The image 22 displayed in the output unit 16 of the image processing device 100 is constructed by superimposing and fusing a plurality of layers 20 (corresponding to a layer A (20a), a layer B (20b), and a layer C (20c) in the present embodiment).

A single or a plurality of objects is allocated to each layer 20. An object is a concept representing an attribute of an image to be displayed. The object in an electronic game, for example, has an attribute value such as a background, a character, or an HUD. An object to which the HUD is assigned as the attribute is allocated to one layer A (20a) as an HUD such as a hit point display part or a magic point display part. An object to which the character is assigned as the attribute value is allocated to one layer B (20b) as a character such as a friend character or an enemy character appearing in a game. An object to which the background is assigned as the attribute value is allocated to one layer C (20c) as a background such as a mountain, a tree, a road, or a house.

Each layer 20 corresponds to a single image, where image data of an object allocated to each layer 20 is rendered.

FIG. 2 illustrates an example where objects A1 to A6 are allocated to the layer A (20a), in which an image of each of the objects A1 to A6 is rendered. Objects B1 to B3 are allocated to the layer B (20b), in which an image of each of the objects B1 to B3 is rendered. Objects C1 to C4 are allocated to the layer C (20c), in which an image of each of the objects C1 to C4 is rendered.

While the number of objects allocated to each layer 20 is reduced in the example illustrated in FIG. 2 in order to provide simple description, more objects are allocated to each layer 20 in the real case.

Priority regarding the superimposition of the layers 20 is set to each layer 20. The layer 20 with high priority is superimposed above the layer 20 with low priority when constructing a fused image by superimposing the plurality of layers 20. That is, in a case where there is an overlap between images of the objects rendered in the plurality of layers 20 being superimposed, the fused image is constructed while prioritizing the image in the layer 20 with higher priority. A region where the image data of the object is not rendered in each layer 20 is left as a transparent region. As a result, the fused image is constructed such that the image rendered in the lower layer 20 can be seen through the upper layer 20 when there is no overlap between the images rendered in the plurality of layers 20 being superimposed.

FIG. 2 illustrates the example where the priority is set in the order of the layer A (20a) over the layer B (20b) over the layer C (20c). The fused image 22 is formed by superimposing the layer A (20a), the layer B (20b), and the layer C (20c). That is, the image is fused such that the image rendered in the layer A (20a) is preferentially displayed when the images rendered in the layers B (20b) and C (20c) overlap the region corresponding to the image rendered in the layer A (20a). Moreover, the image is fused such that the image rendered in the layer B (20b) is preferentially displayed when the image rendered in the layer C (20c) overlaps the region corresponding to the image rendered in the layer B (20b).

FIG. 3 is a set of diagrams illustrating a registration example of the object database stored in the storage unit 12. The object database is registered for each of the plurality of layers constructing the image. An object to be displayed is allocated to each layer and registered. FIG. 2 illustrates the example where the objects A1 to A5 are allocated to the layer A (20a) and registered. Likewise, the objects B1 to B3 are allocated to the layer B (20b) and registered, and the objects C1 to C4 are allocated to the layer C (20c) and registered.

The processing unit 10 executes the image processing program included in a program of the electronic game or the like and performs the process of rendering the object allocated to each layer as the game progresses, for example. Registered into a list of the object database at this time is a rendering command provided to instruct the rendering process by which each object is rendered in each layer. Such rendering command may be a rendering command which calls an API performing the rendering process, for example.

FIG. 3 illustrates the example where there is given a rendering command, to the layer A (20a), to perform a process of rewriting a numeric value included in the object A1 allocated to the layer A. The rendering command is registered in the list. Also registered in association with the layer B (20b) is a rendering command 1 to perform a process of moving the object B1 two dots to the right and three dots upward, the object B1 being allocated to the layer B. Rendering commands 2 to 10 are likewise registered in association with the layer B. Also registered in association with the layer C (20c) is a rendering command 1 to perform a process of moving the object C1 three dots to the right and three dots upward, the object C1 being allocated to the layer C. Rendering commands 2 to 100 are likewise registered in association with the layer C.

Now, there will be described a process performed when 60 frames are rendered per second by a computer that can perform 600 rendering processes (calling the API) per second. In this case, ten rendering commands can be processed per frame.

FIG. 3 illustrates the example where one rendering command is registered in association with the layer A (20a), ten rendering commands are registered in association with the layer B (20b), and 100 rendering commands are registered in association with the layer C (20c) in the object database, whereby the rendering commands add up to 111. It is not possible to process all the rendering commands in one frame when the total number of rendering commands exceeds the number of rendering commands that can be processed per frame (ten commands in this case).

Figure 4:
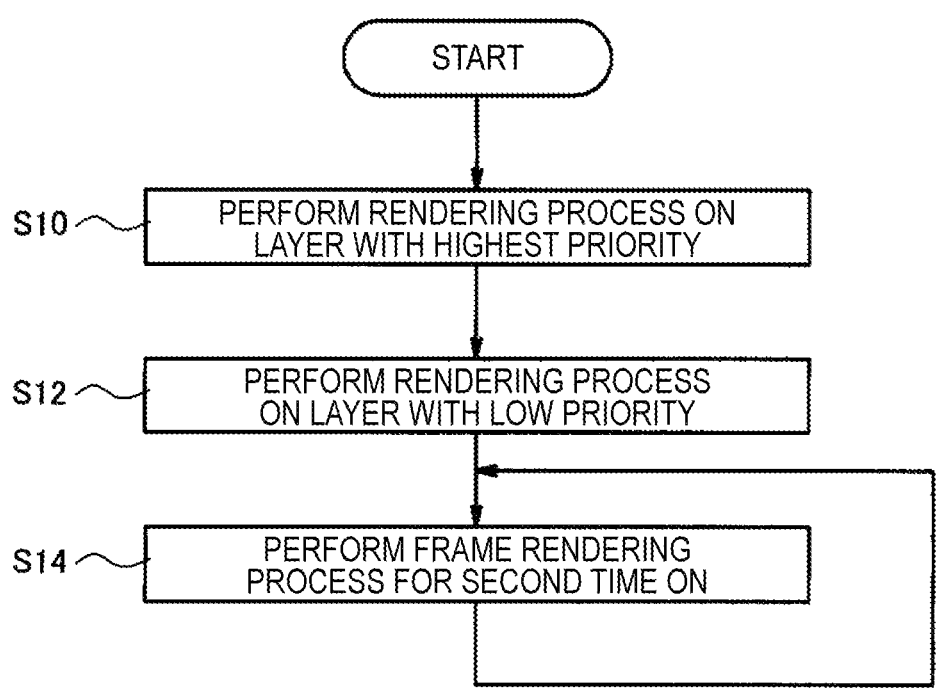
FIG. 4 is a flowchart illustrating image processing according to an embodiment of the present invention.

The present embodiment performs the rendering process such that a picture is displayed smoothly by varying the amount of rendering process performed on each layer in accordance with the priority set to the layer. Specifically, the process is performed according to the flowchart illustrated in FIG. 4.

Performed in step S10 is a process corresponding to a rendering command registered in association with the layer with the highest priority. The example in FIG. 3 illustrates that one rendering command is registered in the list of the object database in association with the layer A (20a) with the highest priority, whereby the processing unit 10 executes the rendering process corresponding to the rendering command. Accordingly, the remaining number of rendering commands registered in association with the layer A in the object database is zero.

Performed in step S12 is a process corresponding to a rendering command registered in association with the layer, the priority of which is lower than the layer with the highest priority. First, one determines the number of rendering commands to be processed in the layer with the second highest priority which is next in line to the layer with the highest priority.

A numeric value A is first calculated by dividing the number of rendering commands registered in the object database in association with the layer to be processed by the number of rendering commands remaining to be processed in the frame that is currently being processed. FIG. 3 illustrates a case where ten rendering commands are registered in association with the layer B (20b) with the second highest priority in the object database, and nine rendering commands remain to be processed in the frame that is currently being processed. The numeric value A is thus calculated to be A=10/9=2 (decimals are rounded up). Then, the number of rendering commands to be processed in the layer B is determined to be a numeric value B that is calculated by dividing the number of rendering commands that can be processed per frame (10 in this case) by the numeric value A being calculated. Therefore, the number of rendering commands to be processed in the layer B equals B=10/2=5. The processing unit 10 executes five rendering commands that are high in priority from among the rendering commands registered in the list of the object database in association with the layer B. The priority set to the rendering command may be determined such that the rendering command registered longer in the list of the object database is given higher priority, for example. As a result, the remaining number of rendering commands registered in association with the layer B in the object database equals five.

The remaining number of rendering commands that can be processed is four, all of which is now allocated to the process performed in the layer C with the lowest priority. The processing unit 10 executes four rendering commands that are high in priority from among the rendering commands registered in the list of the object database in association with the layer C. As a result, the remaining number of rendering commands registered in association with the layer C in the object database equals 96.

Note that the layer C undergoes the process similar to that performed on the layer B when there is a layer with a priority lower than that of the layer C. That is, the remaining number of rendering commands that can be processed in the frame currently being processed equals four after the rendering process is performed on each of the layers A and B, whereby the numeric value A=100/4=25 and the numeric value B=10/25=1 (decimals are rounded up). Accordingly, the processing unit 10 executes one rendering command that is high in priority from among the rendering commands registered in the list of the object database in association with the layer C. This process is repeated until a layer with the lowest priority is processed.

The process up to this point completes the first rewriting of the frame out of 60 frame rewritings performed in a second. The remaining number of rendering commands is now zero for the layer A, five for the layer B, and 96 for the layer C.

Now, the rendering process for the second time on is performed on the frame. Note that a process other than the rendering process may be performed in the middle of one rendering process or between a plurality of rendering processes performed on a frame. Described here is a case where one rendering command is newly added to the layer A before starting the rendering process on the frame for the second time on so that the remaining number of rendering commands is one for the layer A, five for the layer B, and 96 for the layer C.

In step S14, the rendering process is performed on each layer by using an average value (moving average) of the rendering command given to each layer in the image rendering process performed up to the previous frame. The second frame rendering applies the same number of rendering processes as that performed on each layer in the first frame rendering process. That is, one rendering command is executed in the layer A, five rendering commands are executed in the layer B, and four rendering commands are executed in the layer C. The process performed up to this point completes the second rewriting of the frame out of the 60 frame rewritings performed in a second. The remaining number of rendering commands is now zero for the layer A, zero for the layer B, and 92 for the layer C.

The process returns to step S14 where the rendering process for the third time on is performed on the frame. Described here is a case where one rendering command is newly added to the layer A before starting the rendering process on the frame for the third time on so that the remaining number of rendering commands is one for the layer A, zero for the layer B, and 92 for the layer C.

The third frame rendering applies an average value of the number of rendering processes performed on each layer in the first and second frame rendering processes. That is, one rendering command is executed in the layer A, and five rendering commands are executed in the layer B. However, there is no rendering command remaining in the object database in association with the layer B, in which case the corresponding number of rendering commands is moved to a layer with the next priority. As a result, nine rendering commands are executed in the layer C. The process performed up to this point completes the third rewriting of the frame out of the 60 frame rewritings performed in a second. The remaining number of rendering commands is now zero for the layer A, zero for the layer B, and 83 for the layer C.

Note that when three rendering commands are added to the layer B, for example, three rendering commands are executed in the layer B so that the remaining two rendering commands are added to the layer C, in which six rendering commands are executed as a result.

Similarly, the fourth frame rendering applies an average value of the number of rendering processes performed on each layer in the frame rendering processes performed up to this point. When a rendering command is newly added to each layer, the rendering command corresponding in number to the average value of the number of rendering processes in the past is executed in the layer with high priority, and the remaining number of rendering commands, if any, is allocated to the layer with next priority.

In the image processing of allocating the plurality of objects to the layer and superimposing the plurality of layers to be displayed according to the present embodiment, the process of rendering the object is performed while varying the processing amount for each layer in accordance with the rendering priority set to each layer. For each frame, on the other hand, the rendering command is executed for all layers (or as many layers as possible) for which the rendering command is registered in the list. As a result, a picture can be displayed smoothly even when there are a limited number of calls made to the API that can be processed per unit time.

The present embodiment is configured such that the picture appears to be displayed smoothly to a user by making use of the tendency that higher priority is set to the layer including more objects to be shown to the user. The user sees the smooth picture when there are a greater number of objects rendered and included in the layer with high priority than in the layer with lower priority in the rendering process performed in one frame.

In other words, the object drawing more attention from the user is allocated to the layer with high priority, whereby the user can have the impression that the picture is displayed smoothly by preferentially rendering such object. In the rendering process performed in one frame, on the other hand, the object allocated not only to the layer with high priority but to the layer with low priority is rendered as well. This can give the impression to the user that the entire frame is constantly moving little by little, thereby making the delay in the rendering process less conspicuous. While not all objects allocated in the layer with low priority are updated in the single frame rendering process, the picture still appears to be displayed smoothly even when not all the objects are updated at once because the layer with low priority includes an object such as a background image that draws less attention from the user.

Accordingly, a computer (such as a mobile terminal) having insufficient throughput can display the picture that moves naturally as a whole while keeping the delay in the object rendering less conspicuous.

MODIFIED EXAMPLE 1

The object rendering command associated with each layer is managed as the list in the object database. A newly-added rendering command is generally added to the bottom of the list.

When a new rendering command is output to an object that is subjected to a rendering command already registered in a list of an object database, in the present modified example, the rendering commands output to the object are added up.

Where there is already registered a rendering command to move an object B1 allocated to a layer B three dots to the right and three dots upward as illustrated in FIG. 5, for example, the content of the rendering command already registered is rewritten to a process of moving the object five dots to the right and two dots upward, when a new rendering command is added as an additional rendering command to move the object B1 two dots to the right and one dot downward before executing the rendering command already registered.

This process of rewriting the rendering process allows the number of rendering commands registered in the list of the object database to be decreased and the delay in the rendering process to be further suppressed.

MODIFIED EXAMPLE 2

The aforementioned embodiment illustrates the case where the number of rendering processes that can be processed per second (the number of calls made to the API) and the number of frames that can be rendered per second are set in advance. However, the number of rendering processes that can be processed per second (the number of calls made to the API) and the number of frames that can be rendered per second may be measured according to the change in the processing load of a computer so that the process is performed in accordance with the measured value.

While the number of frames that can be rendered per second is ten in the aforementioned embodiment, there may be applied, as the number of rendering commands to be executed in each layer, a value that is calculated by multiplying an average value (moving average) of rendering commands performed in each layer in the image rendering process performed up to a previous frame by a ratio (8/10) of a reference value to a variation of the number of frames that can be rendered per second, for example. Four rendering commands may be executed in a layer B when the average value (moving average) of the rendering commands performed in the layer B equals 5 where the number of rendering commands is calculated to be 5×8/10=4.

The number of frames that can be rendered per second changes with the change in the number of rendering processes that can be processed per second (the number of calls made to the API), in which case the process similar to what is described above may be performed in accordance with the changed number of frames that can be rendered per second.

As a result, the picture can be displayed in accordance with the change in the rendering throughput by performing the process while correcting the number of rendering commands to be executed in each layer according to the change in the number of frames that can be rendered per second. The object rendering process can be properly performed in each layer in accordance with the priority set to the layer especially when the number of rendering commands is corrected by the ratio (8/10) of the reference value to the variation of the number of frames that can be rendered per second.

Note that the number of rendering processes that can be processed per second (the number of calls made to the API) and the number of frames that can be rendered per second may be measured every predetermined period of time or every time a predetermined number of frame rendering processes are completed. Moreover, the measurement may be performed at the start of the game in order to set an initial value of the number of rendering processes that can be performed per second (the number of calls made to the API) and the number of frames that can be rendered per second.

What is claimed is:

1. An image processing device which performs a process of rendering an image in a single frame by allocating an object to be displayed as an image to any of a plurality of layers and superimposing the plurality of layers, wherein the image processing device refers to an object database including a list of object rendering commands for each layer and dynamically changes the number of object rendering processes performed in each layer according to the number of rendering commands included in the list, when rendering an image in a single frame;

wherein a rendering command is rewritten to a command obtained by adding up a rendering command that is already registered and an additional rendering command, when the additional rendering command is output to an object that is subjected to the rendering command that is already registered in the list included in the object database.

2. The image processing device according to claim 1, wherein priority is set to each layer where the object rendering process is preferentially performed on a layer with high priority over a layer with low priority.

3. The image processing device according to claim 1, wherein the number of rendering commands that can be executed in the image rendering for a single frame is distributed to the plurality of layers, and the process of rendering the object allocated to the plurality of layers is performed in accordance with the number of rendering commands being distributed.

4. The image processing device according to claim 1, wherein a numeric value A is calculated by dividing the number of rendering commands registered in association with the layer subjected to the rendering process in the list of the object database by the remaining number of rendering commands that can be executed in the rendering process for a single frame, a numeric value B is calculated by dividing the number of rendering commands that can be executed in the rendering process for a single frame by the numeric value A, and the rendering command corresponding in number to the numeric value B is executed in the layer subjected to the rendering process.

5. The image processing device according to claim 1, wherein the number of rendering commands that can be executed in the image rendering for a single frame is measured, and the number of rendering commands that can be executed in the image rendering for a single frame is distributed to the plurality of layers in accordance with the measured value.

6. A non-transitory computer-readable storage medium storing an image processing program which is provided to perform a process of rendering an image in a single frame by allocating an object to be displayed as an image to any of a plurality of layers and superimposing the plurality of layers, wherein a computer refers to an object database including a list of object rendering commands for each layer and dynamically changes the number of object rendering processes performed in each layer according to the number of rendering commands included in the list when rendering an image in a single frame, the computer including a storage unit which stores the object database;

wherein a rendering command is rewritten to a command obtained by adding up a rendering command that is already registered and an additional rendering command, when the additional rendering command is output to an object that is subjected to the rendering command that is already registered in the list included in the object database.

7. An image processing device which performs a process of rendering an image in a single frame by allocating an object to be displayed as an image to any of a plurality of layers and superimposing the plurality of layers, wherein the image processing device refers to an object database including a list of object rendering commands for each layer and dynamically changes the number of object rendering processes performed in each layer according to the number of rendering commands included in the list, when rendering an image in a single frame;

wherein a numeric value A is calculated by dividing the number of rendering commands registered in association with the layer subjected to the rendering process in the list of the object database by the remaining number of rendering commands that can be executed in the rendering process for a single frame, a numeric value B is calculated by dividing the number of rendering commands that can be executed in the rendering process for a single frame by the numeric value A, and the rendering command corresponding in number to the numeric value B is executed in the layer subjected to the rendering process.

8. The image processing device according to claim 7, wherein priority is set to each layer where the object rendering process is preferentially performed on a layer with high priority over a layer with low priority.

9. The image processing device according to claim 7, wherein the number of rendering commands that can be executed in the image rendering for a single frame is distributed to the plurality of layers, and the process of rendering the object allocated to the plurality of layers is performed in accordance with the number of rendering commands being distributed.

10. The image processing device according to claim 7, wherein the number of rendering commands that can be executed in the image rendering for a single frame is measured, and the number of rendering commands that can be executed in the image rendering for a single frame is distributed to the plurality of layers in accordance with the measured value.

* * * * *